Feb. 11, 1947. C. CHRISTEN 2,415,415
CALCULATOR
Filed Aug. 24, 1944 2 Sheets-Sheet 1
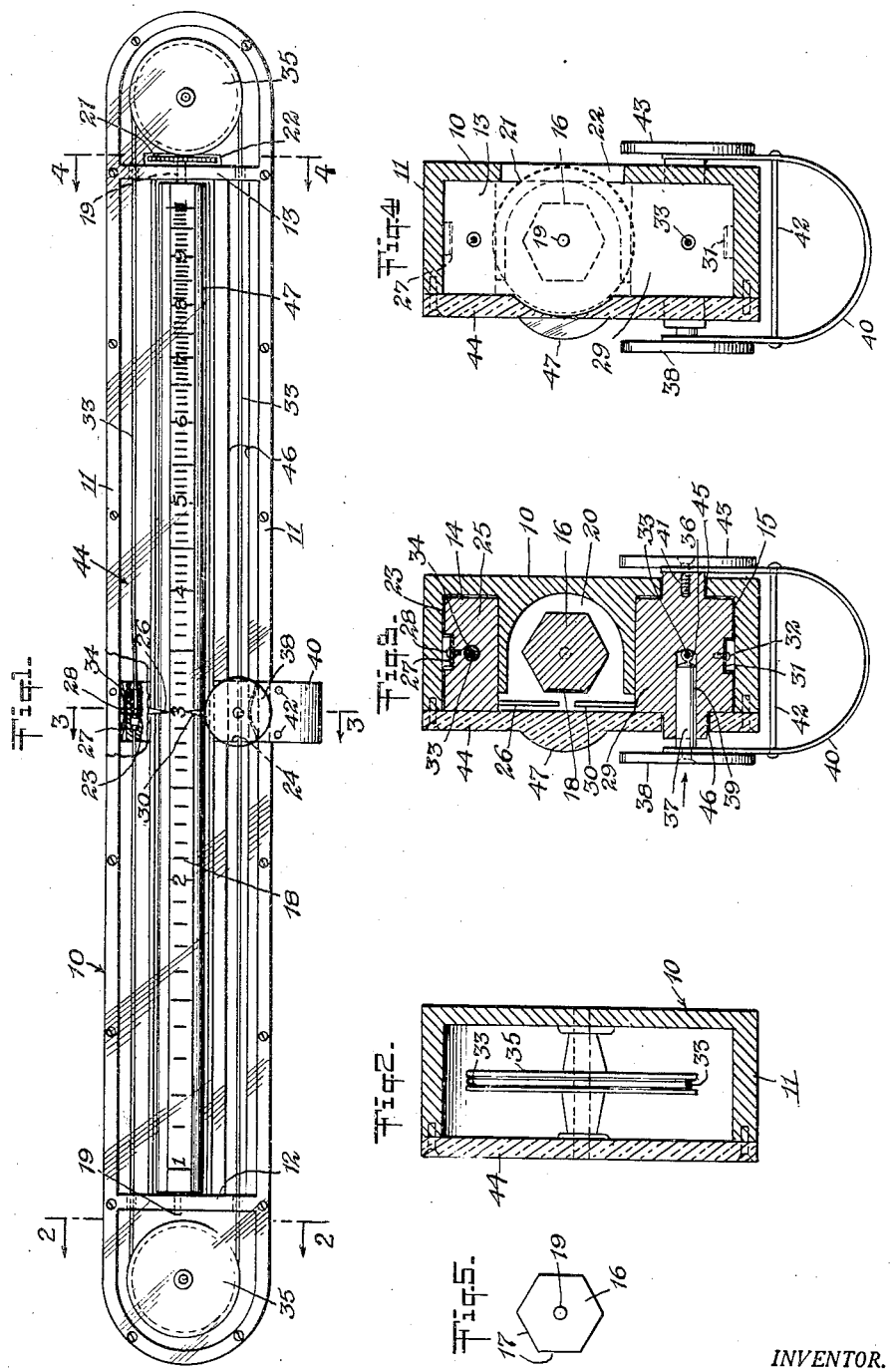
INVENTOR.
Charles Christen Feb. 11, 1947.   C. CHRISTEN   2,415,415
CALCULATOR
Filed Aug. 24, 1944   2 Sheets-Sheet 2
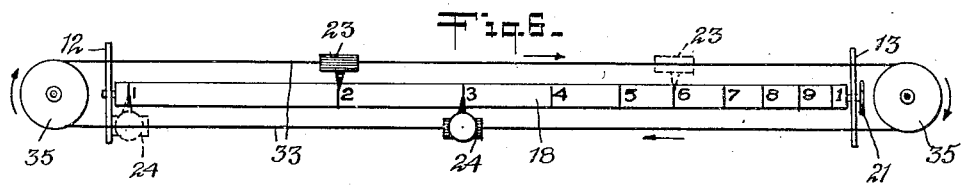
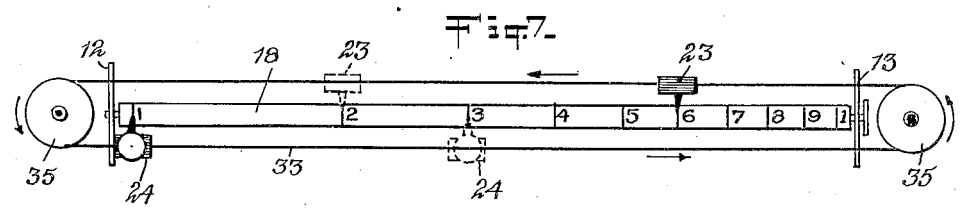
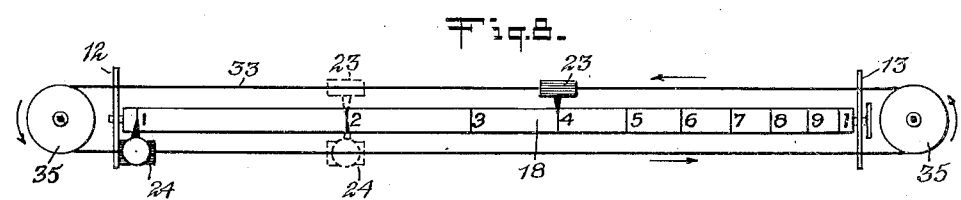
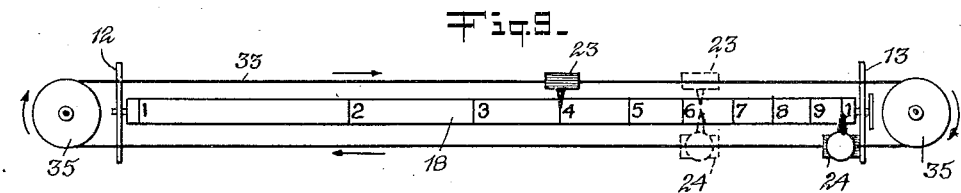
INVENTOR.
Charles Christen
BY
ATTORNEYS Patented Feb. 11, 1947

2,415,415

UNITED STATES PATENT OFFICE 2,415,415

CALCULATOR

Charles Christen, Hastings on Hudson, N. Y., assignor to Keuffel & Esser Company, Hoboken, N. J., a corporation of New Jersey Application August 24, 1944, Serial No. 550,960

17 Claims. (Cl. 235—61)

1

This invention relates to a calculating device having the characteristics of a slide rule.

The principal object of the invention is the provision of a device of the indicated character embodying novel features of construction and operation in order to make it easy to accurately ascertain different values, measurements, equation, and the like.

A further object of the invention is the provision of a simplified calculator capable of making all of the calculations made with an ordinary slide rule.

A further object of the invention is the provision of a calculating device embodying features whereby only a single logarithmic scale may be used, and whereby parts are protected from wear and dirt.

With the foregoing, other objects of the invention will appear when the following specification is read in conjunction with the accompanying drawings, in which—

Fig. 1 is a side view of a calculating device embodying the features of the invention, a portion of the transparent protecting plate being broken away, and the upper indicator being shown in section.

Figs. 2, 3 and 4 are enlarged transverse sectional views taken on the lines 2—2, 3—3 and 4—4, respectively, of Fig. 1.

Fig. 5 is an end view of the adjustable element having additional scales.

Figs. 6, 7, 8 and 9 are diagrammatic views illustrating calculations in multiplication, division and square root.

Referring now more particularly to Figs. 1 to 4 of the drawings, it will be apparent the device includes a base 10 which is of generally oblong shape. The base may be made of any suitable material or combination of materials which will give the desired rigidity and wear resisting quality. The base 10 is open sided in construction and has a marginal rim 11 and cross members which constitute measuring stops 12 and 13, respectively. The base 10 also has spaced upper and lower longitudinal guideways 14 and 15, respectively, which are parallel to each other and extend to the stops 12 and 13.

Use is made of a rod 16 which provides a plurality of longitudinally extending faces 17. In the present instance, the rod is cross-sectionally hexagonal, and therefore provides six faces 17. On one face 17 is printed, etched, inscribed or otherwise formed a logarithmic scale 18 graduated in the manner of the D scale of the conventional slide rule. The usual A, B and C scales

2 are eliminated. In order that the device may perform all of the functions of the conventional slide rule certain of the faces 17 of the rod will contain the additional sine, tangent and sine tangent scales, respectively. The rod 16 has coaxial arbors 19 on the ends which are received in bearings in the cross members 12 and 13, respectively, to support the rod 16 in a longitudinal recess 20 in the base 10 for rotational adjustment to present any desired scale. The rod 16 is frictionally held in the adjusted position in the present instance, although other suitable means for doing so may be provided. One of the arbors 19 has a knurled disk 21 secured thereto. The disk projects into a slot 22 in the base to enable the manipulation of the disk for the purpose of adjusting the rod to present the selected scale.

Upper and lower indicators 23 and 24 have guided movement in the guideways 14 and 15, respectively. The indicators 23 and 24, therefore, are movable with respect to each other in planes paralleling each other. The indicator 23 consists of a block 25 having a pointer 26. A bowed spring 27 is secured to the block in a recess as at 28. The ends of the spring 27 bear on one side of the guideway 14 to cause a constant friction between the block 25 and the other side of the guideway 14 to releasably retain the indicator 23 in the adjusted positions to which it is moved. The indicator 24 consists of a block 29 having a pointer 30. The block 29 also carries a spring 31 similar to and for the same purpose of the spring 27. The spring 29 is secured as at 32.

The stops 12 and 13 are so arranged with respect to the scale 18 that they limit the movement of the indicators 23 and 24 to bring their respective pointers 26 and 30 in registry with the graduation adjacent the numbers "1" on the scale.

Means are provided to cause the indicators 23 and 24 to move in unison in opposite directions with respect to the scale 18, or to cause the lower indicator 24 to move with respect to the scale 18 and also with respect to the upper indicator 23. The said means include a pull cord which may be in the nature of a fish-line 33. Fish-line is found practical for all intents and purposes since it does not stretch and is strong. The opposite ends of the line 33 are secured to the block 25 of the upper indicator in any suitable manner. The block 25 has a large and a small bore therein. The bores communicate with each other and open through the opposite ends, respectively, of the block. One end of the line is knotted and extends in the small bore. The large bore is tapped to receive an adjusting screw 34 with a longitudinal bore therein to receive the other knotted end of the line 33. The screw 34 may be adjusted to compensate for any possible stretch of the line and to keep it taut, in order to assure accuracy. The line 33 passes around grooved pulleys or sheaves 35 supported on the base 10 at the ends thereof. The line 33 also passes through the block 29 of the lower indicator 24, said block 29 being provided with a longitudinal bore 36 for that purpose. Use is made of a pin 37 having a head 38 which serves as a thumb piece. The pin 37 is movable in a bore 39 in the block 29. The bore 39 is disposed at a right angle with respect to the bore 36. The pin 37 is movable into and out of engagement with the line 33 to either clutch it in engagement with the block 29, or to unclutch the line 33 from the block. A bowed spring 40, has one end thereof secured to the block 29 at the rear by a screw 41 or the like, and the other end of the spring has a hole therein to receive the pin 37 while bearing on the head 38. Headed members 42 loosely engaged with the legs of the spring 40 limit the separation thereof and so limit the outward movement of the pin 37 to its unclutching position. A finger piece 43 in the form of a disk is held in place against the rear end of the spring 40 by the screw 41. The parts 29, 37, 38, 40, 41, 42 and 43 constitute a manually operable clutch to grip and release the line 33, and also serve as a means to move the lower indicator 24 between the stops 12 and 13 and into and out of engagement therewith.

A transparent cover 44 conforming to the shape of the base 10 is removably secured to the rim 11 to enclose all but the thumb piece 38 and the finger-piece 43. The arbors of the pulleys extend into holes, respectively, in the cover 44. The cover also has a longitudinal slot 46 to accommodate a boss on the front of the block 29, and the base 10 has a slot 45 to accommodate a boss on the rear of the block. The slots 45 and 46 are provided in order that the disks 38 and 43 may be disposed so as to receive pressure from the thumb and forefinger of one hand of the user in operating the clutch and effecting the movement of the lower indicator 24.

The cover 44 embodies a magnifying lens 47 to aid in reading the scale 18 while observing the pointers 26 and 30.

From the foregoing it will be apparent the device of the present invention does with the single scale 18 all of the usual operations done on a slide rule. The square root of a number can be found without the aid of the usual square root scale. The numbers in this calculator are always read in exactly the same position. It is not necessary for the user to interpret values on a scale that is continually changing its position, and to read one number directly over a second number on an adjacent scale, which operation at times is confusing because the values of the subdivisions are not always the same.

Furthermore, the upper indicator 23 is enclosed and cannot be accidentally moved while setting the lower indicator when its clutch mechanism is disengaged.

Also, the extraction of a square root is a form of division where the required number is the number, which when multiplied by itself will give the number of which we want the square root. Proceeding as in dividing, the square root occurs at the point where the indicators meet. Besides eliminating the square root scale, the present device accurately performs with a full length scale.

The device performs division in a more logical manner.

Also, the single manipulatable means gives the user positive control of the device, eliminating the fumbling with a slide, and its works with a constant friction not present in the usual slide rule, since the slide always works harder when it is fully engaged. The result of any calculation may be easily checked if the accuracy of an operation is in doubt.

In Fig. 6 an operation in the multiplication of 2 x 3 is illustrated. The procedure is as follows. The clutch is manipulated by exerting pressure with the thumb and forefinger on the disks 38 and 43 to clutch the line 33. The upper indicator 23 in response to the movement of the line 33 is brought to a position in which its pointer 26 registers with the graduation adjacent the number "2" as shown in full lines. The clutch is released to unclutch the line 33 whereupon the lower indicator 24, by using the disks 38 and 43, is brought to a position in which its pointer 30 registers with the graduation adjacent the number "3" as shown in full lines. The upper indicator 23 remains stationary. The clutch is again manipulated to grip the line 33 after which the lower indicator 24 is moved to the left into engagement with the stop 12, as shown in dotted lines. The upper indicator 23 will have been moved to the right to the position shown in dotted lines, and in said position the pointer 26 will register with the graduation adjacent the number "6" which is the "product."

In Fig. 7 an operation in the division of 6÷3 is illustrated. The upper indicator 23 is set at the graduation adjacent the number "6," as shown in full lines, by clutching the lower indicator 24 to the line 33 and moving it as required. The lower indicator 24 is then released from the line 33 and is brought into engagement with the stop 12. The indicator 24 is then clutched to the line 33 and is moved to the right to the graduation adjacent the number "3," as shown in dotted lines, thereby causing the upper indicator 23 to move to the left, through the intervention of the line 33 moving as indicated by the arrows. Consequently, the pointer 26 of the upper indicator 23 will be brought into registry with the graduation adjacent the number "2," the quotient.

In Fig. 8 an operation in ascertaining the square root of "4" is illustrated. The upper indicator 23 is set at the graduation adjacent the number "4" by clutching the lower indicator 24 to the line 33 and moving it as required. The lower indicator 24 is then released from the line 33 and is brought into engagement with the stop 12. The indicator 24 is then clutched to the line 33 and is moved to the right until the pointers 26 and 30 meet, which will be at a point in registry with the graduation adjacent the number "2," thereby giving the square root sought.

In Fig. 9 an operation in ascertaining the square root of "40" is illustrated. The indicator 23 is set at the graduation adjacent the number "4" by clutching the indicator 24 to the line 33 and moving it as required. The indicator 24 is then released from the line 33 and is brought into engagement with the stop 13. The indicator 24 is then clutched to the line 33 and is moved to the left until the pointers 26 and 30 meet, which will be at a point on the scale 18 indicating the square root "6.32+."

For working out problems in trigonometry the other scales on the rod 16 may be brought into view by adjusting the rod, and kept there long enough for the user to set the indicator 23 or 24 to the required value, or to change a value into degrees and minutes.

From the foregoing it will be understood there is described a calculating device which is simple of construction and operation, enabling the user to solve problems expeditiously and without confusion.

I claim:

1. A calculating device comprising a base, a scale on said base, upper and lower indicators having guided movement on said base to give direct readings on said scale, and means to cause said indicators to move in unison in either direction with respect to the scale or to cause the lower indicator to move with respect to the scale and the upper indicator.

2. A calculating device as set forth in claim 1, wherein said means includes a manually operable clutch.

3. A calculating device as set forth in claim 1, wherein said means includes a line having guided movement and whose opposite ends are connected with opposite sides respectively of said upper indicator, and a clutch carried by said lower indicator and engageable with said line and disengageable from the line.

4. A calculating device as set forth in claim 1, wherein said indicators are caused to move in unison in opposite directions with respect to said scale by said means.

5. A calculating device as set forth in claim 1, and measuring stops on the opposite ends respectively of said base to limit the movement of said lower indicator to the left or to the right with respect to said scale.

6. A calculating device comprising a base, a logarithmic scale on said base, upper and lower blocks having guided movement in parallel paths on said base, upper and lower indicator points on said blocks respectively movable therewith and also with respect to said scale, a pull cord having its opposite ends connected with the opposite sides respectively of the upper block, sheaves on said base supporting said cord for guided movement, a manipulatable clutch carried by the lower block to couple the cord to said lower block or to uncouple the cord from the lower block, for the purpose of moving the blocks and their indicator points in unison with respect to said scale, or to cause the lower block and its indicator point to move with respect to the upper block and its indicator point and also with respect to said scale.

7. A calculating device as set forth in claim 6, wherein said clutch consists of a headed pin and resilient means acting on said pin to normally retain the pin disengaged from the cord.

8. A calculating device comprising a base, a scale on said base, means on said base including an upper indicator having guided movement with respect to said scale, a lower indicator on said base having guided movement with respect to said scale, and manually operable means engageable with said first means to cause said indicators to move in unison with respect to the scale or disengageable from said first means to cause the lower indicator to move in either direction with respect to said upper indicator and the scale.

9. A calculating device as set forth in claim 6, and means to maintain said cord taut.

10. A calculating device as set forth in claim 1, and resilient means to provide a constant friction engagement of the indicators with the base.

11. In a calculating device, a scale, continuous flexible means guided to move in paths along said scale, means having an indicator which traverses said scale fixed to said flexible means in one of its paths and movable along said scale, a second means having an indicator which traverses said scale movable along said scale, and operable means on said second means to engage said flexible means in another of its paths to move both indicators simultaneously.

12. In a calculating device, a logarithmic scale, continuous flexible means guided to move in paths along said scale, means having an indicator which traverses said scale fixed to said flexible means in one of its paths and movable along said scale, a second means having an indicator which traverses said scale movable along said scale, and operable means on said second means to engage said flexible means in another of its paths to move both indicators simultaneously.

13. In a calculating device, a logarithmic scale, continuous flexible means guided to move in straight paths parallel to said scale, means having an indicator which traverses said scale fixed to said flexible means in one of said straight paths and movable along said scale, a second means having an indicator which traverses said scale movable along said scale, and operable means on said second means to engage said flexible means in another of said straight paths to move both indicators simultaneously.

14. In a calculating device, a graduated scale, continuous flexible means guided to move in paths along said scale, means having an indicator which traverses said scale fixed to said flexible means in one of its paths and movable along said scale, a second means having an indicator which traverses said scale movable along said scale, stop means to limit movement of said second means and said second indicator to the limits of scale graduations, and operable means on said second means to engage said flexible means in another of its paths to move both indicators simultaneously.

15. In a calculating device, a graduated scale, continuous flexible means guided to move in paths along said scale, means having an indicator which traverses said scale fixed to said flexible means in one of its paths and movable along said scale, stop means to limit movement of said means and said indicator to the limits of scale graduations, a second means having an indicator which traverses said scale movable along said scale, stop means to limit movement of said second means and said second indicator to the limits of scale graduations, and operable means on said second means to engage said flexible means in another of its paths to move both indicators simultaneously.

16. In a calculating device, a logarithmic scale, continuous flexible means guided to move between sheaves in straight paths along said scale, means having an indicator which traverses said scale fixed to said flexible means in one of its straight paths and movable in guides along said scale and having means to retain a setting, stop means to limit movement of said means and said indicator to the limits of scale graduations, a second means having an indicator which traverses said scale movable in guides along said scale and having means to retain a setting, stop means to limit movement of said second means and said second indicator to the limits of scale graduations, and operable clutch means on said second means to engage said flexible means in another of its paths to move both indicators simultaneously.

17. In a calculating device, a polygonal member having a plurality of scales, continuous flexible means guided to move in paths along said polygonal member, means having an indicator which traverses said scale fixed to said flexible means in one of its paths and movable along said polygonal member, a second means having an indicator which traverses said scale movable along said polygonal member, and operable means on said second means to engage said flexible means in another of its paths to move both indicators simultaneously.

CHARLES CHRISTEN.

REFERENCES CITED

The following references are of record in the file of this patent:

UNITED STATES PATENTS

| Number | Name | Date |
|---|---|---|
| 745,562 | Bergey | Dec. 1, 1903 |
| 1,599,904 | Lotzbeyer | Sept. 14, 1926 |

FOREIGN PATENTS

| Number | Country | Date |
|---|---|---|
| 461 | British | 1912 |